US012794007B2

(12) United States Patent
Choi et al.

(10) Patent No.: US 12,794,007 B2
(45) Date of Patent: Nov. 10, 2026

(54) APPARATUS FOR SEALING SECONDARY BATTERY

(71) Applicant: LG Energy Solution, Ltd., Seoul (KR)

(72) Inventors: Kwang Hee Choi, Daejeon (KR); Dong Kyun Ha, Daejeon (KR); Hye Ji Lee, Daejeon (KR); Seung Ho Na, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 11 days.

(21) Appl. No.: 18/836,202

(22) PCT Filed: Feb. 7, 2023

(86) PCT No.: PCT/KR2023/001753
§ 371 (c)(1),
(2) Date: Aug. 6, 2024

(87) PCT Pub. No.: WO2023/149789
PCT Pub. Date: Aug. 10, 2023

(65) Prior Publication Data

US 2026/0011768 A1 Jan. 8, 2026

(30) Foreign Application Priority Data

Feb. 7, 2022 (KR) ........................ 10-2022-0015838

(51) Int. Cl.
*H01M 10/04* (2006.01)

(52) U.S. Cl.
CPC ... *H01M 10/0481* (2013.01); *H01M 10/0404* (2013.01)

(58) Field of Classification Search
CPC ...................... H01M 10/0481; H01M 10/0404
See application file for complete search history.

(56) References Cited

U.S. PATENT DOCUMENTS

| | | | | |
|---|---|---|---|---|
| 2016/0049682 | A1 | 2/2016 | Won et al. | |
| 2017/0074634 | A1* | 3/2017 | Yoon | G01B 11/06 |
| 2018/0047950 | A1* | 2/2018 | Lim | H01M 50/183 |
| 2023/0048295 | A1 | 2/2023 | Lee et al. | |

FOREIGN PATENT DOCUMENTS

| | | | |
|---|---|---|---|
| CN | 101465217 | B | 4/2011 |
| CN | 113725524 | A | 11/2021 |
| DE | 102019219467 | A1 | 6/2021 |
| JP | 2942755 | B1 | 8/1999 |

(Continued)

OTHER PUBLICATIONS

Machine Translation of WO2021/015590A1 (Year: 2021).*

(Continued)

*Primary Examiner* — Daniel Mcnally
(74) *Attorney, Agent, or Firm* — Lerner David LLP

(57) ABSTRACT

An apparatus for sealing a secondary battery including a pouch type battery case includes a pair of sealing parts and at least one sensing part. The pair of sealing parts are disposed to face each other with a battery case interposed therebetween where the distance between the pair of sealing parts is adjustable. The sensing part is positioned between the pair of sealing parts and configured to detect a change in pressure according to a change in the distance between the pair of sealing parts.

8 Claims, 7 Drawing Sheets

(56) References Cited

FOREIGN PATENT DOCUMENTS

| | | | | | |
|---|---|---|---|---|---|
| JP | 2006108162 | A | | 4/2006 | |
| JP | 2010003763 | A | | 1/2010 | |
| JP | 2013159073 | A | | 8/2013 | |
| JP | 2015100976 | A | | 6/2015 | |
| JP | 2021147822 | A | | 9/2021 | |
| KR | 20170019211 | A | | 2/2017 | |
| KR | 101713075 | B1 | | 3/2017 | |
| KR | 101762807 | B1 | | 7/2017 | |
| KR | 101763980 | B1 | | 8/2017 | |
| KR | 20180028714 | A | | 3/2018 | |
| KR | 20190107922 | A | | 9/2019 | |
| KR | 102091768 | B1 | | 3/2020 | |
| KR | 20200141858 | A | | 12/2020 | |
| KR | 102240019 | B1 | | 4/2021 | |
| KR | 20210047729 | A | | 4/2021 | |
| KR | 20210103282 | A | | 8/2021 | |
| WO | WO-2021015590 | A1 | * | 1/2021 | ......... B29C 66/9241 |

OTHER PUBLICATIONS

International Search Report for PCT/KR2023/001753 mailed May 9, 2023. 2 pages.

Extended European Search Report including Written Opinion for Application No. 23750021.0 dated Apr. 28, 2025. 9 pages.

* cited by examiner (a)

(b)

APPARATUS FOR SEALING SECONDARY BATTERY

CROSS-REFERENCE TO RELATED APPLICATIONS

The present application is a national phase entry under 35 U.S.C. § 371 of International Application No. PCT/KR2023/001753 filed on Feb. 7, 2023, which claims the benefit of the priority of Korean Patent Application No. 10-2022-0015838, filed on Feb. 7, 2022, all of which are hereby incorporated by reference in its entirety.

TECHNICAL FIELD

The present disclosure relates to an apparatus for sealing a secondary battery, and more particularly, to an apparatus for sealing a secondary battery including a pouch type battery case.

BACKGROUND ART

As the technical development of and a demand for mobile devices increase, a demand for secondary batteries as energy sources rapidly increases. Among the secondary batteries, lithium secondary batteries having high energy density and discharge voltage much and are researched, also are commercialized and widely used.

In general, the lithium secondary batteries are configured by embedding an electrode assembly in a battery case made of a metal can or a laminate sheet in a state, in which the electrode assembly constituted by a positive electrode, a negative electrode, and a separator interposed between the positive electrode and the negative electrode is stacked or wound, and then injecting or impregnating an electrolyte into the battery case.

Recently, due to a larger capacity of secondary batteries, processing for manufacturing a case having a large area and made of a thin material attracts a lot of interest. Accordingly, the use of a pouch type secondary battery, which has a structure in which a stacked type or stack and folding type electrode assembly is embedded in a pouch type battery case made of a laminate sheet, gradually increases for reasons such as low manufacture cost, small weight, and easy change in shape.

A battery case S of this pouch type secondary battery is sealed by a sealing apparatus to have a sealing structure in order to prevent external leakage and damage of the electrode assembly and the electrolyte inside the battery case S.

FIGS. 1*a* and 1*b* illustrate that a sealing apparatus 1 according to the related art seals the battery case S. As illustrated in FIGS. 1*a* and 1*b*, the sealing apparatus 1 according to the related art is generally provided in a pair, and the pair of sealing apparatus 1 are disposed at an upper side and a lower side, respectively, of the secondary battery S and then seal the battery case S by applying a fixed temperature and pressure.

Specifically, the sealing apparatus 1 according to the related art may be provided to move vertically toward the secondary battery S, and have a structure which includes a sealing block 2 for pressing the secondary battery S and a protrusion 3 protruding from one surface of the sealing block 2 to have a predetermined height.

In particular, as the respective protrusions 3 of the pair of sealing apparatuses 1 are disposed to face each other, as illustrated in FIG. 1*a*, when each of the sealing apparatuses 1 moves toward the battery case S by a predetermined distance or greater, the respective protrusions 3 of the pair of sealing apparatuses 1 are in contact with each other to limit the movement of the sealing apparatus 1. Accordingly, the battery case may be prevented from being excessively pressed.

As illustrated in FIG. 1*b*, however, when a sealing portion of the battery case S has an initial thickness equal to or larger than a certain level due to a tolerance of a sealing material or the like, the respective protrusions 3 of the pair of sealing apparatuses 1 fail to be in contact with each other and are spaced a predetermined gap G from each other. Accordingly, in the related art, a user checks the gap G between the protrusions 3 through the naked eyes to adjust a gap between the sealing apparatuses 1. However, there is a problem that when the gap G between the protrusions 3 is difficult to check through the naked eyes, the user has difficulty in noticing the abnormal condition.

This cause a problem that the sealing portion of the battery case S is not sufficiently pressed and thus has the thickness that exceeds a predetermined thickness. Accordingly, a plurality of battery case S sealing portions have non-uniform thicknesses, and processing conditions for initial equipment settings and processing conditions after mass production vary so that processing stability is reduced. Thus, there is a need for the techniques for solving the problems.

DISCLOSURE

Technical Problem

The present disclosure has been devised to solve the problems as above and an object of the present disclosure is to provide an apparatus for sealing a secondary battery, which is capable of maintaining a thickness of a sealing portion of a battery case to be uniform during sealing of the battery case of the secondary battery.

Technical Solution

The present disclosure provides an apparatus for sealing a secondary battery including: a pair of sealing parts that are disposed to face each other with a battery case, in which an electrode assembly is embedded, interposed therebetween, and are provided so that a distance therebetween is adjustable; and at least one sensing part that is provided between the pair of sealing parts and detects a change in pressure according to a change in gap between the pair of sealing parts.

Each of the sealing parts may include a sealing block, which presses and seals a sealing portion of the battery case, and a pair of protrusions which protrude from one surface, which faces the battery case, of the sealing block.

The respective protrusions of the pair of sealing parts may be disposed to face each other.

The pair of protrusions may protrude from both ends of the sealing block, respectively.

The sensing part may be fixed to and installed on each of the protrusions.

The sensing part may be pressed between the respective protrusions of the pair of sealing parts.

The sensing part may be fixed to and supported by at least one of the pair of sealing parts.

The sensing part may include at least one pressure sensor.

The apparatus for sealing the secondary battery according to the present disclosure may further include an output interface that outputs an alarm based on a pressure value detected by the sensing part.

In addition, the apparatus for sealing the secondary battery according to the present disclosure may further include a controller that compares the pressure value obtained by the sensing part with a preset pressure value to control a moving distance of the sealing part.

Advantageous Effects

The present disclosure may include the at least one sensing part, which detects the change in pressure according to the change in gap between the pair of sealing parts, to control the gap between the pair of sealing parts on the basis of the pressure value detected by the sensing part. Accordingly, the present disclosure has the effect that the thickness of the sealing portion may be ensured to be uniform.

DETAILED DESCRIPTION

Figure 1A:
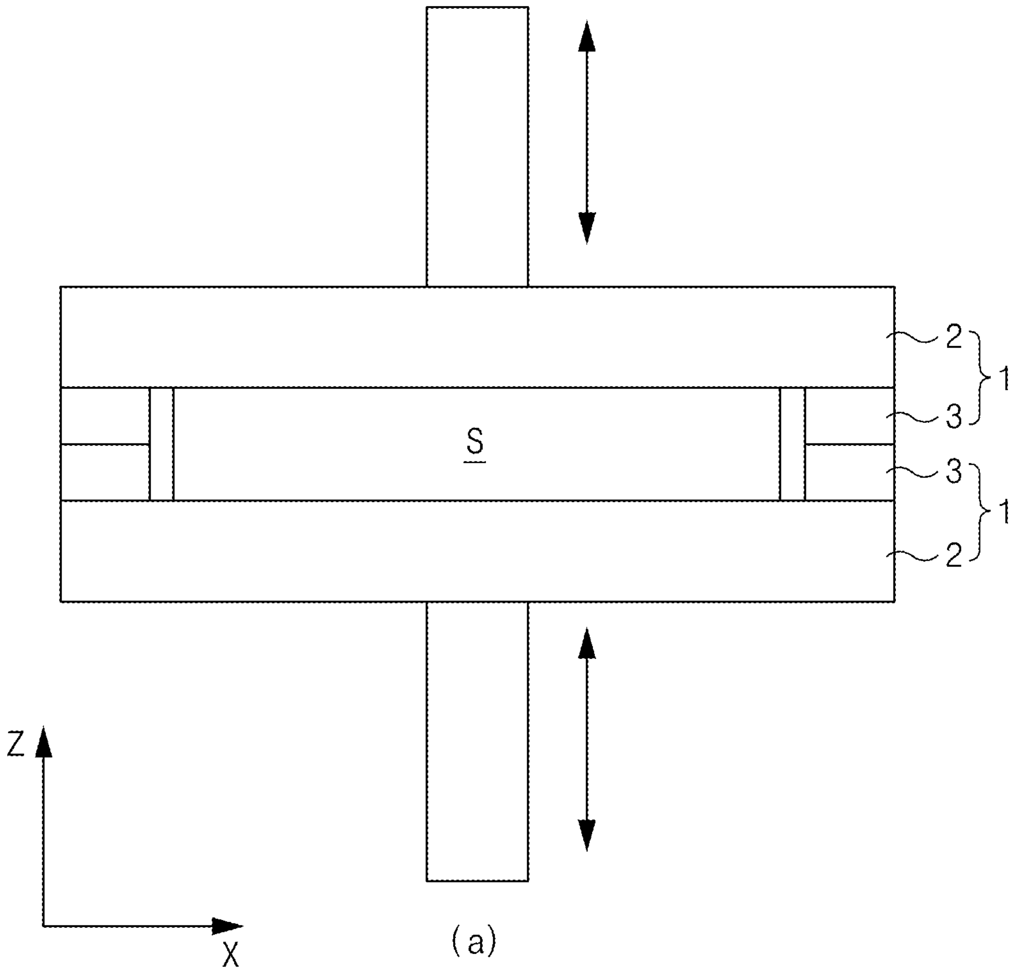
FIG. 1A is a conceptual view illustrating that a pair of apparatuses for sealing a secondary battery seal a battery case according to the related art.
Figure 1B:
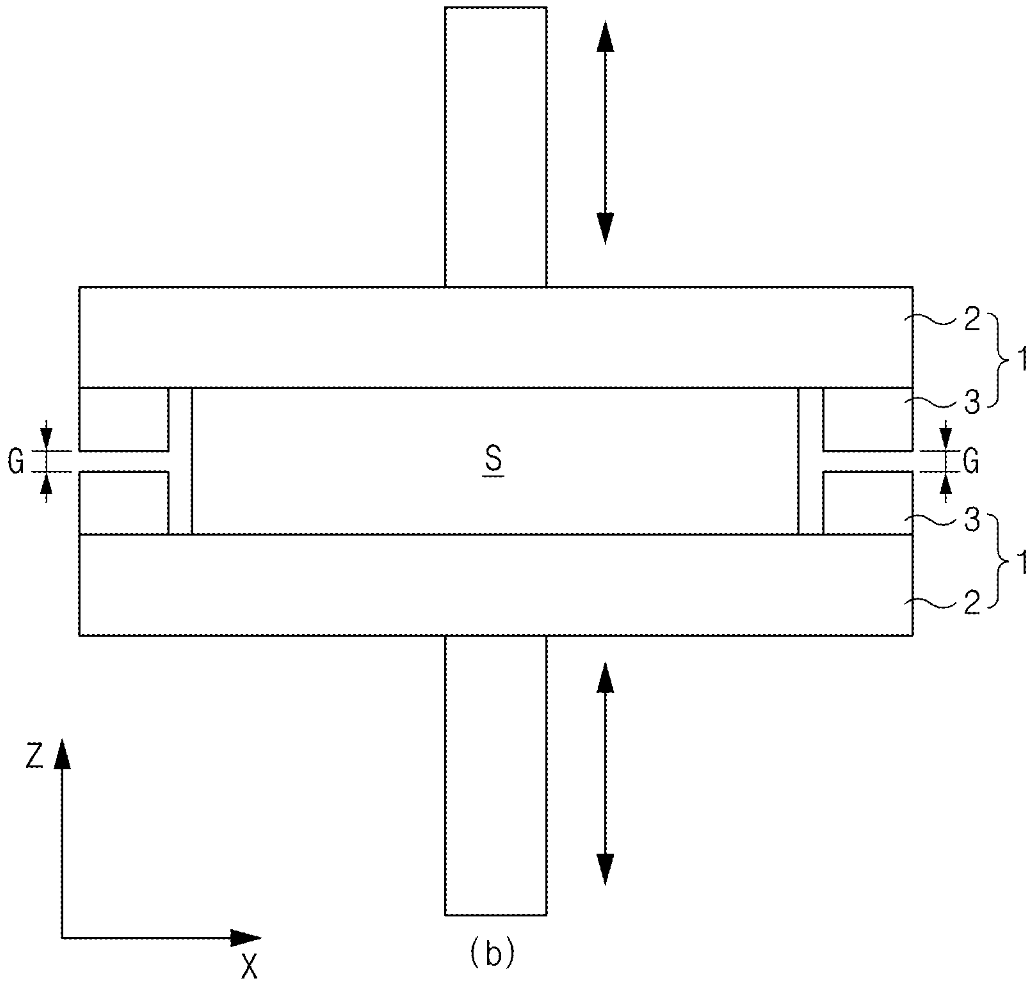
FIG. 1B is a conceptual view illustrating that the apparatuses for sealing the secondary battery in FIG. 1A seal the battery case in a state of failing to be in contact with each other.

Hereinafter, preferred embodiments of the present invention will be described in detail with reference to the accompanying drawings to enable those skilled in the art to which the present disclosure pertains to easily carry out the embodiments of the present invention. The present invention may, however, be embodied in different forms and should not be construed as limited by the embodiments set forth herein.

The parts unrelated to the description, or the detailed descriptions of related well-known art that may unnecessarily obscure subject matters of the present disclosure, will be ruled out in order to clearly describe the present disclosure. Like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present disclosure on the basis of the principle that an inventor can properly define the concept of a term to describe and explain the embodiments of the invention in the best ways.

The present disclosure provides an apparatus 10 for sealing a secondary battery, including a pair of sealing parts 100, which are disposed to face each other with a battery case S, in which an electrode assembly (not shown) is embedded, interposed therebetween and are provided so that a distance therebetween is adjustable, and at least one sensing part 200 which is provided between the pair of sealing parts 100 and detects a change in pressure according to a change in gap between the pair of sealing parts 100.

Specifically, the sealing parts 100 are components, which are disposed to face each other with the battery case S, in which the electrode assembly is embedded, interposed therebetween and are provided so that the distance therebetween is adjustable, and may have various configurations.

Here, the electrode assembly may have a configuration in which electrodes such as a positive electrode and a negative electrode, and separators are alternately disposed. More specifically, the electrode assembly may have a structure in which a positive electrode collector/a positive electrode active material layer/a separator/a negative electrode active material layer/a negative electrode collector are stacked in sequence and thus, the positive electrode active material layer on one surface of the separator faces the negative electrode active material layer on the other surface of the separator. This electrode assembly may be embedded in the battery case S.

The battery case S may be sealed by the apparatus 10 for sealing the secondary battery to have a sealing structure in order to prevent the electrode assembly and an electrolyte inside the battery case S from leaking to the outside and to prevent the electrode assembly and the electrolyte from being exposed to the outside to be damaged.

For example, each of the sealing parts 100 may include a sealing block 110, which presses and seals a sealing portion of the battery case S, and a pair of protrusions 120 which protrude from one surface, which faces the battery case S, of the sealing block 110.

Here, the sealing block 110 is a component, which presses and seals the sealing portion of the battery case S, and may have various configurations. Here, the sealing portion is a portion to be sealed in the battery case S, and may include at least one side of an outer circumference of the battery case S. For example, the sealing portion may be provided in a circumferential direction of the battery case S.

Specifically, the sealing block 110 may press and seal the sealing portion of the battery case S by moving to correspond to the sealing portion. Here, the sealing part 100 may additionally include a connecting part 130, which has one end connected to the sealing block 110 and the other end connected to a moving means (not shown), to move the sealing block 110. Here, the moving means may include a driving device such as an actuator.

The sealing block 110 may additionally include a heating part (not shown) to press and heat the sealing portion at the same time so that the sealing portion is thermally fused. The heating part may heat the sealing portion to a temperature higher than the room temperature.

Here, the room temperature means a range of temperatures, which is called a constant temperature in the relevant field. That is, the room temperature means a temperature inside an experimental room, a laboratory or the like, and particularly, refers to an indoor air temperature as an expression of a temperature condition used when an experiment is carried out without setting or adjusting a temperature or when a specimen and a material are left indoors. The room temperature generally refers to a temperature at which humans are comfortable, and is usually about 15° C. to about 20° C.

Accordingly, the temperature higher than the room temperature may be a temperature of 20° C. or higher, and more specifically, when a sealing layer to be thermally fused in the sealing portion is made of a polypropylene resin, the temperature higher than the room temperature may be set to 160° C. to 190° C.

The sealing block 110 may have various shapes such as a bar shape. Here, as illustrated in FIGS. 2A to 3B, the pair of protrusions 120 protruding in one direction may be provided on the one surface of the sealing block 110.

Specifically, each of the protrusions 120 is a component that protrudes from the one surface, which faces the battery case S, of the sealing block 110, and may have various configurations. In more detail, the pair of protrusions 120 may protrude from both ends of the sealing block 110, respectively. Here, the respective protrusions 120 of the pair of sealing parts 100 may be disposed to face each other.

That is, when the pair of sealing parts 100 move toward the battery case S by a predetermined distance or greater, at least one of the protrusions 120 disposed to face each other may be in contact with the sensing part 200, which will be described later, to limit the movement of the sealing parts 100.

For example, when the sensing part 200 to be described later is fixed to and installed on any one of the protrusions 120 disposed to face each other as illustrated in FIGS. 2A to 3B, the protrusion 120 on which the sensing part 200 is not installed may be in contact with the sensing part 200 to limit the movement of the sealing parts 100.

Accordingly, the protrusion 120 may prevent the sealing portion of the battery case S from being excessively pressed, and may prevent a thickness of the sealing portion from being less than a preset thickness. Here, the thickness may be understood as a height in a Z direction in FIGS. 2A to 3B, and the same may be understood below.

The apparatus 10 for sealing the secondary battery according to the present disclosure may include the sensing part 200 so as to prevent the thickness of the sealing portion from exceeding the preset thickness due to insufficiently pressing of the sealing portion of the battery case S.

This sensing part 200 is a component including at least one sensing part 200, which is provided between the pair of sealing parts 100 and detects a change in pressure according to a change in gap between the pair of sealing parts 100, and may have various configurations.

For example, the sensing part 200 may include at least one pressure sensor. Here, various types of pressure sensors such as a resonance pressure sensor, a piezoelectric pressure sensor, a strain gauge pressure sensor, and a capacitive pressure sensor, may be used as the pressure sensor.

Specifically, the sensing part 200 may be provided between the pair of sealing parts 100 to detect a pressure value varying as soon as the pair of sealing parts 100 are in contact with each other. Here, the change in pressure value detected by the sensing part 200 may mean that the sealing portion of the battery case S is being pressed.

When the pair of sealing parts 100 move by a distance less than a predetermined distance and thus fail to sufficiently press the sensing part 200 or fail to be in contact with the sensing part 200, the pressure value detected by the sensing part 200 may be less than a preset pressure value. Here, the preset pressure value may be understood as a pressure value detected by the sensing part 200 to correspond to a time point at which the thickness of the sealing portion of the battery case S has the preset thickness.

For example, when the sensing part 200 fails to be in contact with the pair of sealing parts 100, the pressure value of the sensing part 200 may not be changed from an initial set value. Here, when the initial set value is "0", the pressure value of the sensing part 200 may be also "0".

That is, when the pressure value of the sensing part 200 is less than the preset pressure value, a user may recognize that the sealing portion of the battery case S is not being sufficiently pressed. Then, the user may control the pair of sealing parts 100 so that a distance between the pair of sealing parts 100 is decreased, to sufficiently press the sealing portion. Accordingly, the thickness of the sealing portion of the battery case S may be adjusted to be uniform.

This sensing part 200 may be provided between the pair of sealing parts 100, and in this case, the sensing part 200 may be fixed to each of the pair of sealing parts 100 or may be fixed by a separate device provided between the pair of sealing parts 100.

Preferably, the sensing part 200 may be fixed to and installed on each of the pair of sealing parts 100 in order to reduce the manufacturing costs and simplify the structure. In this case, the sensing part 200 may be fixed to and supported by at least one of the pair of sealing parts 100.

Figure 2A:
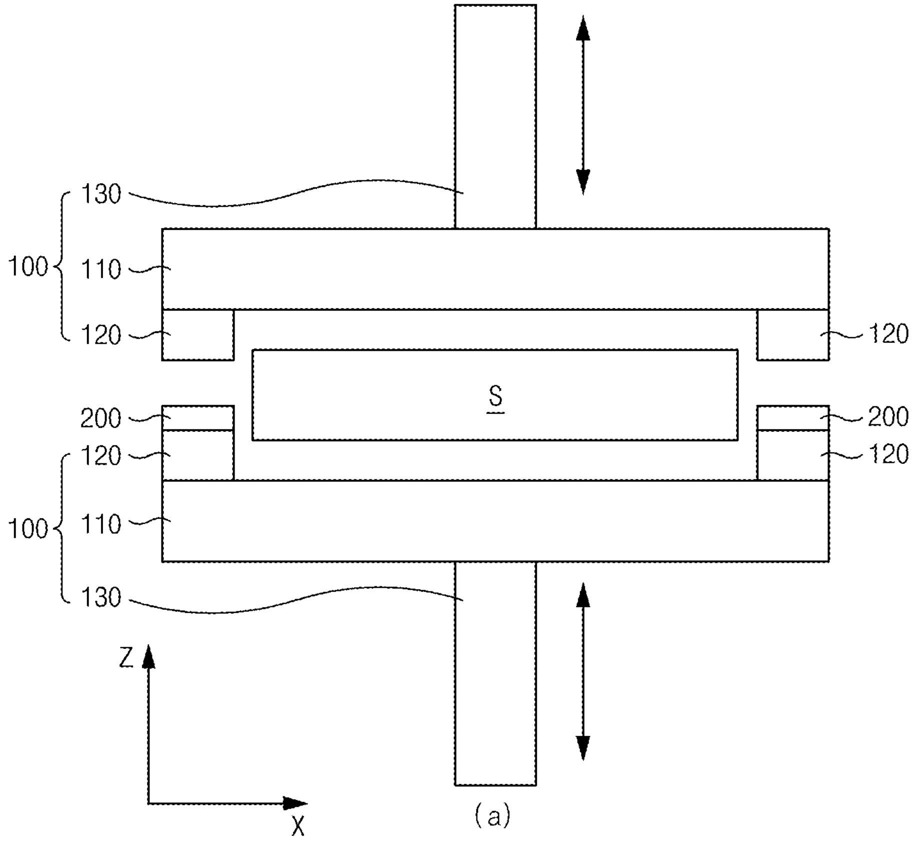
FIG. 2A is a conceptual view illustrating a state in which a pair of apparatuses for sealing a secondary battery are spaced apart from each other according to Embodiment 1 of the present invention.
Figure 2B:
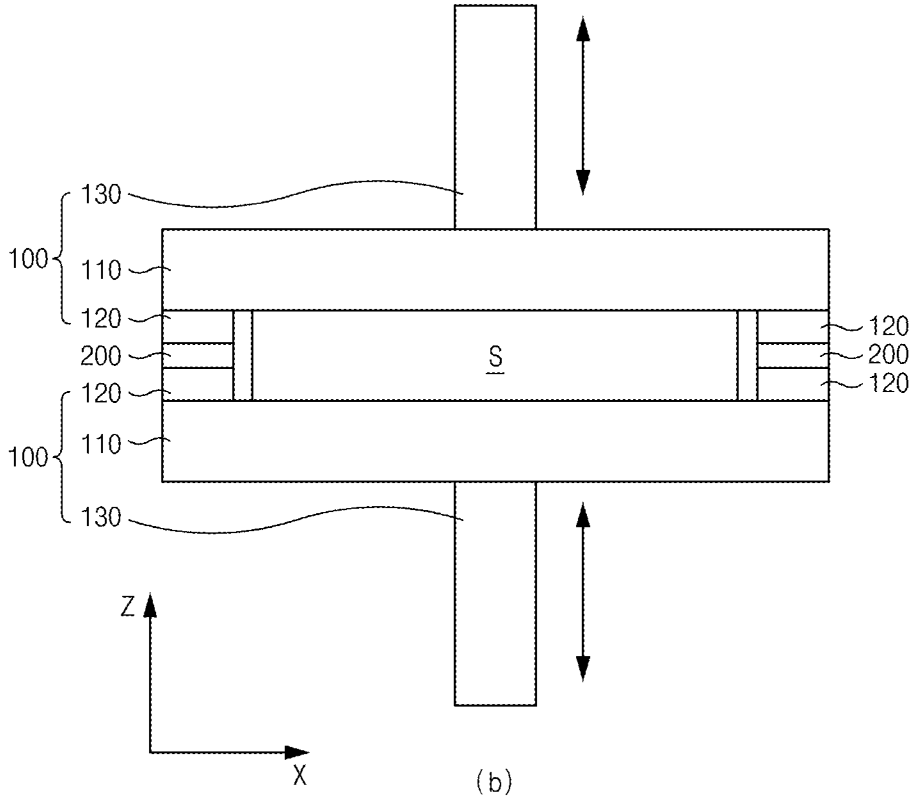
FIG. 2B is a conceptual view illustrating a state in which the pair of apparatuses for sealing the secondary battery in FIG. 2A are in contact with each other to seal a battery cell.
Figure 3A:
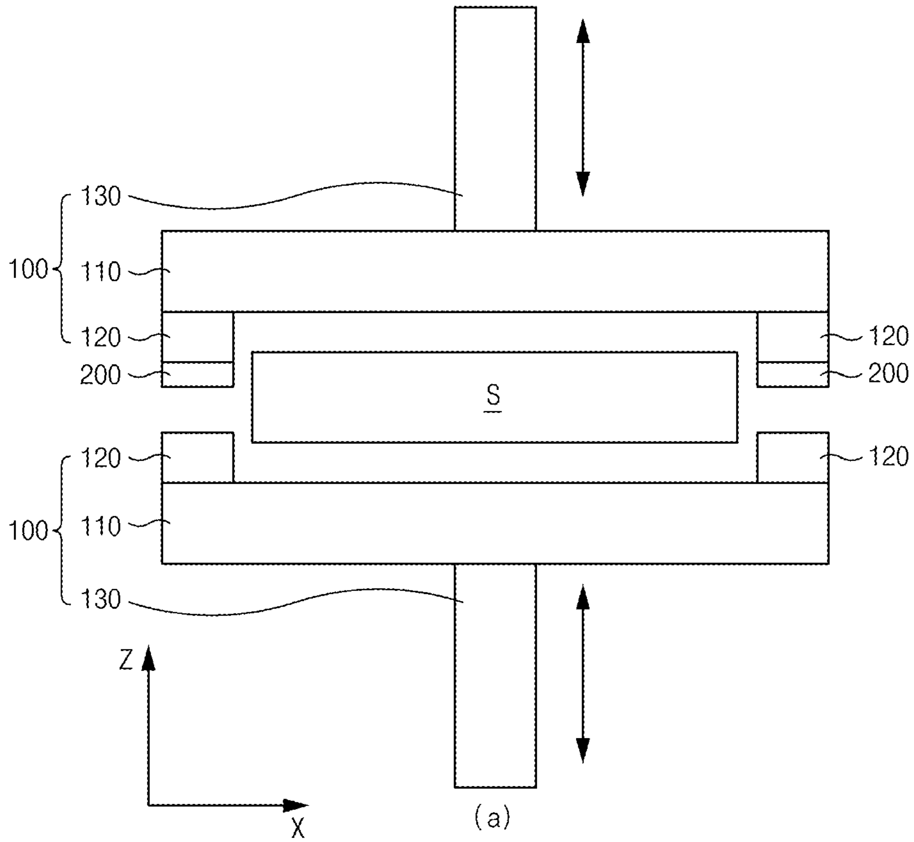
FIG. 3A is a conceptual view illustrating a state in which a pair of apparatuses for sealing a secondary battery are spaced apart from each other according to Embodiment 2 of the present invention.
Figure 3B:
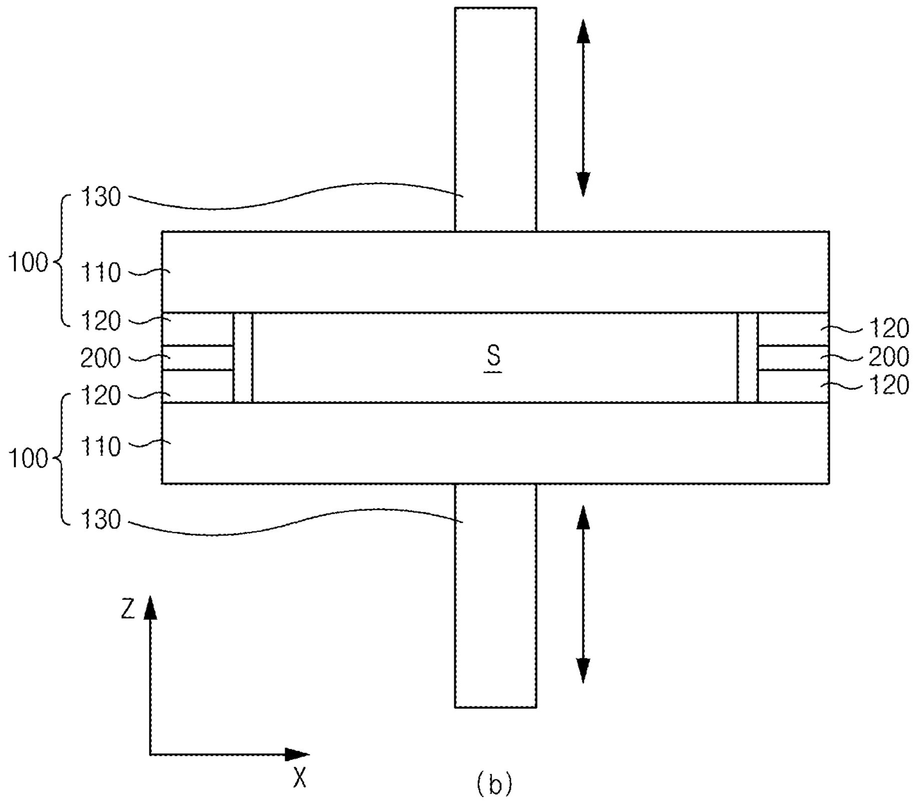
FIG. 3B is a conceptual view illustrating a state in which the pair of apparatuses for sealing the secondary battery in FIG. 3A are in contact with each other to seal a battery cell.

As one example, the sensing part 200 may be fixed to and installed on the sealing part 100, which is disposed at a lower side of the battery case S, of the pair of sealing parts 100 as illustrated in FIGS. 2A and 2B. As another example, the sensing part 200 may be fixed to and installed on the sealing part 100, which is disposed at an upper side of the battery case S, of the pair of sealing parts 100 as illustrated in FIGS. 3A and 3B.

Here, preferably the sensing part 200 may be fixed to and installed on the protrusion 120. That is, as illustrated in FIGS. 2B and 3B, the sensing part 200 may be pressed between the respective protrusions 120 of the pair of sealing parts 100.

Figure 4:
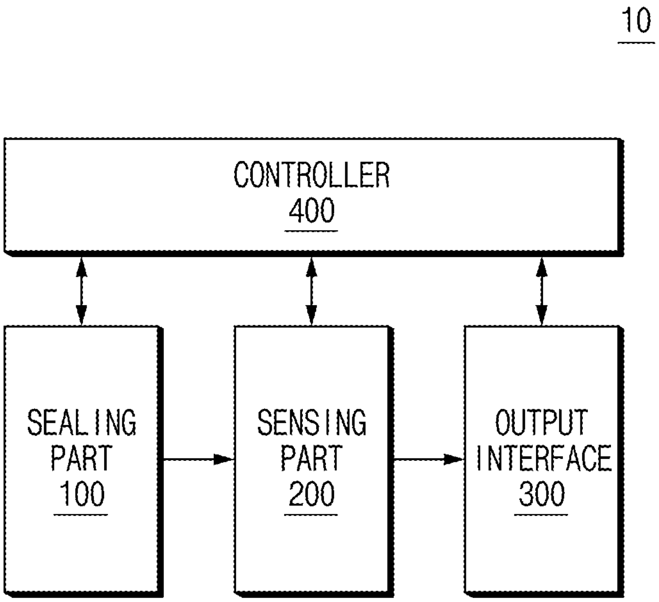
FIG. 4 is a schematic view illustrating an apparatus for sealing a secondary battery according to Embodiment 3 of the present invention.

The apparatus for sealing the secondary battery according to the present disclosure, as illustrated in FIG. 4, may further include an output interface 300 that outputs an alarm based on the pressure value detected by the sensing part 200.

Specifically, the output interface 300 is a component, which outputs an alarm based on the pressure value detected by the sensing part 200, and may have various configurations.

For example, the output interface 300 may receive the detected pressure value from the sensing part 200 in a near-field wired communication method such as controller area network (CAN), serial communication, and Ethernet, or a wireless communication method such as Bluetooth, infrared data association, ZigBee, and Wi-Fi, and then output the received pressure value as an image and/or sound.

This output interface 300 may include a display module, which outputs the alarm based on the pressure value as an image, and/or a speaker module, which outputs the alarm based on the pressure value as sound, or the like.

The apparatus for sealing the secondary battery according to the present disclosure may further include a controller 400 that compares the pressure value obtained by the sensing part 200 with the preset pressure value to control a moving distance of the sealing part 100.

Specifically, the controller 400 is a component, which compares the pressure value obtained by the sensing part 200 with the preset pressure value to control the moving distance of the sealing part 100, and may have various configurations.

For example, when the pressure value detected by the sensing part 200 is less than the preset pressure value, the controller 400 may control the moving distance of the sealing part 100 so that the pair of sealing parts 100 are closer to each other.

Of course, when the pressure value detected by the sensing part 200 is greater than the preset pressure value, the controller 400 may control the moving distance of the sealing part 100 so that the pair of sealing parts 100 are not as close to each other.

Although the present disclosure has been described with reference to the limited embodiments and drawings, the present disclosure is not limited thereto and may be variously implemented by those of ordinary skill in the art to which the present disclosure pertains, within the technical idea of the present disclosure and an equivalent of the appended claims.

DESCRIPTION OF THE SYMBOLS

10: Apparatus for sealing secondary battery
100: Sealing part
110: Sealing block
120: Protrusion
130: Connecting part
200: Sensing part
300: Output interface
400: Controller

The invention claimed is:

1. An apparatus for sealing a secondary battery, the apparatus comprising:

a pair of sealing parts disposed to face each other and configured to adjust a distance therebetween such that a battery case having an electrode assembly can be interposed between the pair of sealing parts, wherein each of the sealing parts includes a sealing block configured to press and seal a sealing portion of the battery case and a pair of protrusions protruding from a surface of the sealing block, wherein the surface of the sealing block faces the battery case, and wherein a sensing part is fixed to at least one protrusion among the pair of protrusions and configured to detect a change in pressure according to a change in a distance between a protrusion of a first sealing block of a pair of sealing blocks and a protrusion of a second sealing block of the pair of sealing blocks.

2. The apparatus of claim 1, wherein the pairs of protrusions for each of the sealing parts are disposed to face each other.

3. The apparatus of claim 1, wherein the pair of protrusions are disposed on opposite ends of the sealing block, respectively.

4. The apparatus of claim 1, wherein the sensing part is configured to be pressed between the protrusions of the first sealing block and the protrusion of the second sealing block.

5. The apparatus of claim 1, wherein the sensing part is fixed to both protrusions of the pair of protrusions of at least one sealing part.

6. The apparatus of claim 1, wherein the sensing part comprises at least one pressure sensor.

7. The apparatus of claim 1, further comprising an output interface configured to output a signal based on a pressure value detected by the sensing part.

8. The apparatus of claim 1, further comprising a controller configured to compare a pressure value obtained by the sensing part with a preset pressure value to control the distance between the protrusion of the first sealing block of the pair of sealing parts and the protrusion of the second sealing block of the pair of sealing parts.

* * * * *